US011943119B2

(12) United States Patent
Maes et al.

(10) Patent No.: US 11,943,119 B2
(45) Date of Patent: Mar. 26, 2024

(54) MANAGING A CLOUD SERVICE

(71) Applicant: Hewlett Packard Enterprise Development LP, Houston, TX (US)

(72) Inventors: Stephane H. Maes, Sunnyvale, CA (US); Matthew Simon Newman, Sunnyvale, CA (US); Keith Kuchler, Ft. Collins, CO (US); Thomas Goepel, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 213 days.

(21) Appl. No.: 17/301,112

(22) Filed: Mar. 25, 2021

(65) Prior Publication Data
US 2021/0218645 A1 Jul. 15, 2021

Related U.S. Application Data

(63) Continuation of application No. 15/788,361, filed on Oct. 19, 2017, now Pat. No. 10,979,320, which is a continuation of application No. 14/406,711, filed as application No. PCT/US2012/045424 on Jul. 3, 2012, now Pat. No. 9,825,823.

(51) Int. Cl.
*H04L 41/5051* (2022.01)
*G06F 9/50* (2006.01)
*H04L 43/091* (2022.01)
*H04L 67/10* (2022.01)

(52) U.S. Cl.
CPC ........ *H04L 41/5051* (2013.01); *G06F 9/5072* (2013.01); *H04L 43/091* (2022.05); *H04L 67/10* (2013.01)

(58) Field of Classification Search
CPC ... H04L 41/5051; H04L 43/091; H04L 67/10; G06F 9/5072
See application file for complete search history.

(56) References Cited

U.S. PATENT DOCUMENTS

| 7,996,488 | B1 | 8/2011 | Casabella et al. |
| 8,335,851 | B1 | 12/2012 | Vendrow |
| 8,392,566 | B1 | 3/2013 | Salle et al. |
| 9,003,406 | B1* | 4/2015 | Hodge ................ G06F 9/45533 718/1 |
| 9,825,823 | B2 | 11/2017 | Maes et al. |
| 10,979,320 | B2* | 4/2021 | Maes .................... G06F 9/5072 |
| 2011/0083167 | A1 | 4/2011 | Carpenter et al. |
| 2011/0126207 | A1 | 5/2011 | Wipfel et al. |
| 2011/0138047 | A1 | 6/2011 | Brown et al. |

(Continued)

FOREIGN PATENT DOCUMENTS

| CN | 102291390 A | 12/2011 |
| EP | 2460087 A1 | 6/2012 |
| WO | 2011/014160 A1 | 2/2011 |

OTHER PUBLICATIONS

BMC Software, "BMC Cloud Lifecycle Management," Solution White Paper, 2011, pp. 1-16.

(Continued)

*Primary Examiner* — Kenneth Tang
(74) *Attorney, Agent, or Firm* — Slater Matsil, LLP

(57) ABSTRACT

A technique includes providing at least one service blueprint to orchestrate application programming interfaces to manage the lifecycle of at least one cloud service.

19 Claims, 4 Drawing Sheets

(56) References Cited

U.S. PATENT DOCUMENTS

| | | |
|---|---|---|
| 2011/0296021 A1 | 12/2011 | Dorai et al. |
| 2012/0042055 A1 | 2/2012 | Agarwala et al. |
| 2013/0185413 A1* | 7/2013 | Beaty .................. H04L 67/1001 709/224 |
| 2013/0232480 A1* | 9/2013 | Winterfeldt ........... G06F 9/5072 717/177 |
| 2013/0239089 A1* | 9/2013 | Eksten .................. G06F 21/105 717/120 |
| 2013/0254768 A1* | 9/2013 | Wipfel .................... G06F 9/455 718/1 |
| 2014/0006627 A1 | 1/2014 | Arwe et al. |
| 2014/0068560 A1 | 3/2014 | Eksten et al. |
| 2014/0075032 A1 | 3/2014 | Vasudevan et al. |
| 2015/0199197 A1 | 7/2015 | Maes et al. |
| 2015/0304175 A1 | 10/2015 | Maes et al. |
| 2016/0057234 A1 | 2/2016 | Parikh et al. |
| 2016/0072683 A1* | 3/2016 | Xie ..................... H04L 41/0843 709/220 |
| 2016/0078361 A1 | 3/2016 | Brueckner et al. |
| 2017/0004018 A1* | 1/2017 | Mangtani .............. G06F 9/5072 |

OTHER PUBLICATIONS

Cisco, "Cisco Intelligent Automation for Cloud," Data Sheet, 2012, pp. 1-9.

Dinh Khoa Nguyen et al: "Blueprinting Approach in Support of Cloud Computing", Future Internet, vol. 4, No. 4, Mar. 21, 2012 (Mar. 21, 2012), pp. 322-346.

European Search Report and Search Opinion Received for EP Application No. 12880628.8, dated Feb. 4, 2016, 7 pages.

International Preliminary Report on Patentability received for PCT Patent Application No. PCT/US2012/045424, dated Jan. 15, 2015, 6 pages.

International Search Report and Written Opinion received for PCT Patent Application No. PCT/US2012/045424, dated Feb. 28, 2013, 7 pages.

Jeff Guerrero et al., "Building a Cloud on FlexPod: Validated Management Solutions," 2011, pp. 1-5 [oniine], Retrieved from the Internet on Mar. 14, 2013 at URL: <http:i/www.netapp.com/us/communities/tech-ontap/tot-building-a-cloud-on-flexpod-1203.html>.

Korean Intellectual Property Office, International Search Report, dated Feb. 28, 2013, 9 pages, Daejeon Metropolitan City, Republic of Korea.

Mek Enterprises LLC, "Cioupia Continues to Strengthen Converged Infrastructure Orchestration Offerings" with New Solution Announcements, Jun. 12, 2012. pp. 1.5 [online], Retrieved from the internet on Mar. 14, 2013 at URL: <http://www.marketwatch.com/story/cloupia-continues-to-strengthen-converged-infrastructure-orchestration-offerings-with-new-solution-announcements-2012-06-12>.

Papazoglou et al., "Blueprinting the Cloud", 2011, IEEE Computer Society, pp. 74-79. (Year: 2011).

Unknown, Cloupia Continues to Strengthen Converged Infrastructure Orchestration Offerings with New Solution Announcements, Jun. 12, 2012, 5 pages.

* cited by examiner

MANAGING A CLOUD SERVICE

BACKGROUND

A cloud service generally refers to a service that allows end recipient computer systems (thin clients, portable computers, smartphones, desktop computers and so forth) to access a pool of hosted computing and/or storage resources (i.e., the cloud resources) and networks over a network (the Internet, for example). In this manner, the host, a cloud service provider, may, as examples, provide Software as a Service (SaaS) by hosting applications; Infrastructure as a Service (IaaS) by hosting equipment (servers, storage components, network components, etc.); or a Platform as a Service (PaaS) by hosting a computing platform (operating system, hardware, storage, etc.).

A typical cloud service incurs charges on a demand basis, is managed by the cloud service provider and may be scaled (scaled according to desired storage capacity, processing power, network bandwidth and so forth) by the end user. The cloud service may be a public service (an Internet-based service, for example) that is generally available to all potential users or a limited access private service that is provided over a private network (a business enterprise network, for example) as well as a managed cloud service (e.g., a virtual private cloud service) or a hybrid cloud service (a cloud service that is a combination of the above). Traditionally, when a user orders a cloud service, the user may manually perform various actions related to deploying and configuring software associated with the ordered cloud service (e.g. deployment of virtual machines (VMs), middleware, application software, application components, and so forth) on the provisioned/instantiated infrastructure.

DETAILED DESCRIPTION

Figure 1:
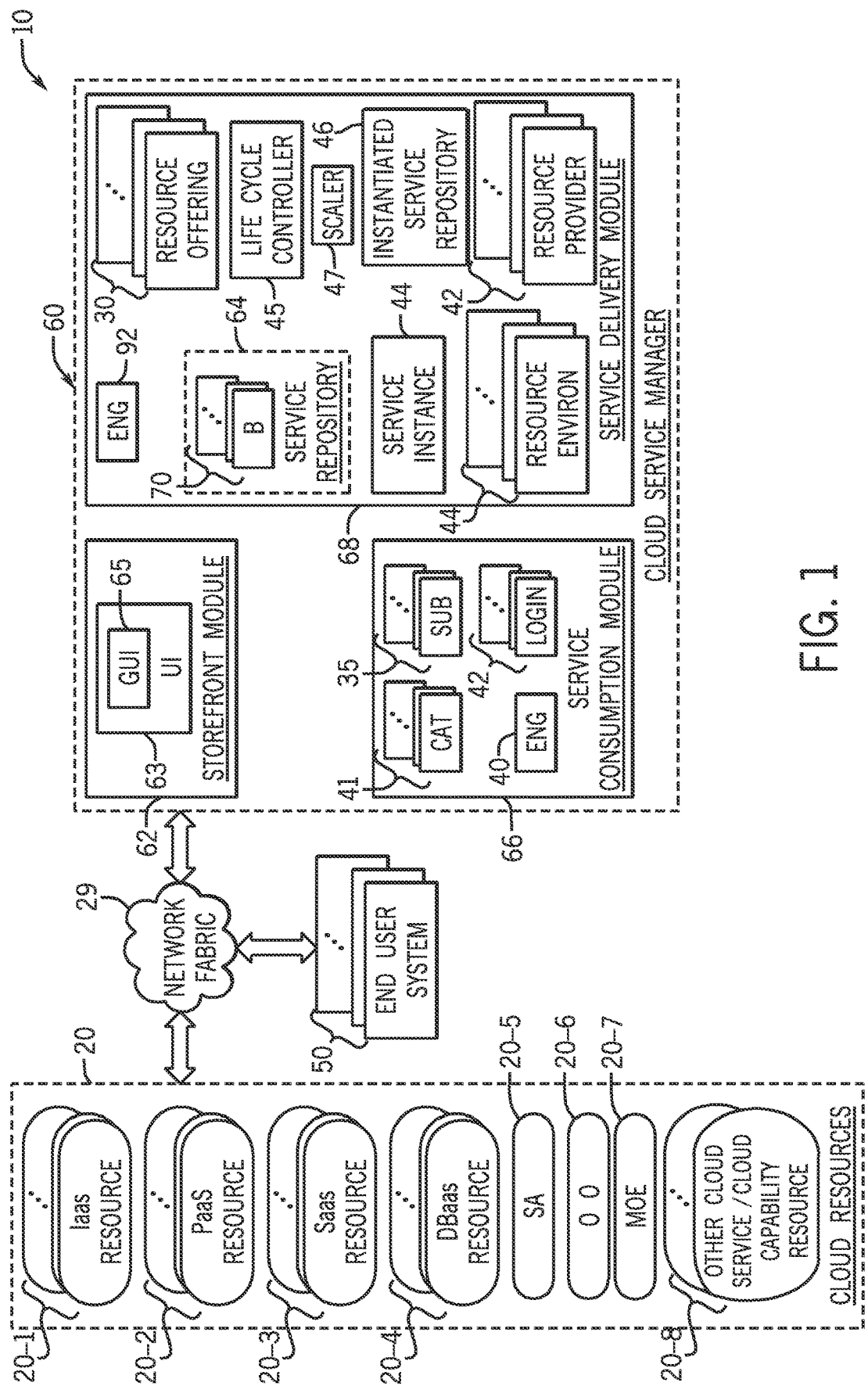
FIG. 1 is a schematic diagram of a cloud computing system according to an example implementation.

Referring to FIG. 1, in accordance with systems and techniques that are disclosed herein, a cloud service manager 60 offers and delivers (instantiates, provisions and deploys, for example) services to manage the lifecycles (e.g., manage the building, ongoing management, reporting, metering, reporting and so forth) of existing cloud services and combinations of these existing cloud services for end users. More particularly, as disclosed herein, the cloud service manager 60 orchestrates the use of application programming interfaces (APIs) of existing cloud services for managing the lifecycles of the existing cloud services and combinations of the existing cloud services for users of user end systems 50 (desktops, portable computers, smartphones, clients, thin clients, servers, and so forth).

Depending on the particular implementation, the selection and ordering of the cloud lifecycle management services may be performed by a given user (an administrator, for example) for a group of end users (users of an enterprise, for example); or the selection and ordering of the cloud capabilities may be performed by a given user (an Internet-based user or employee, for example) for the given user's individual use.

As depicted in FIG. 1, the cloud service manager 60 may be accessed by a given end user system 50 via network fabric 29 (network fabric formed from one or more of local area network (LAN) fabric, wide area network (WAN) fabric, Internet fabric, and so forth). As such, depending on the particular implementation, the cloud service manager 60 may reside on an Internet server, reside on a server within a private LAN, reside on a server within a WAN, reside on a desktop computer, or may be a web or SaaS (Software as a service), as just a few examples.

In general, the users of the cloud service manager 60 may select and order "cloud capabilities" through the cloud service manager 60. In general, the "cloud capabilities" refer to user-selected combinations of existing cloud services that are provided by existing cloud resources 20, as well as lifecycle management services that are offered and delivered by the cloud service manager 60. All of these cloud capabilities (the existing cloud services, the combinations of the existing cloud services and the lifecycle management services) are generally referred to herein as "cloud capabilities" herein.

The cloud capabilities are, in general, associated with services that are associated with a "cloud," which may be, as examples, a public cloud (a cloud formed from an Internet-based network and provides hosted cloud services that are generally available to members of the public); a private cloud (a cloud formed from a private, limited access network, (such as an enterprise network) which provides hosted cloud services to a limited group of members); a virtual private cloud (a cloud formed from a public network providing hosted cloud services to a limited group of members); a hybrid cloud (a cloud formed from a combination of two or more of the aforementioned clouds); and so forth.

In general, the cloud service manager 60 contains a storefront or marketplace module 62 that, through its user interface 63, allows a user to access a service consumption module 66 (of the cloud service manager 60) for purposes of browsing and selecting offered cloud capabilities. Moreover, through the access to the service consumption module 66, users may further customize (e.g., configure, for example) details of the selected cloud capabilities; agree to terms and/or conditions for receiving the selected cloud capabilities; order the cloud capabilities (subscribe to the capabilities, pay for the capabilities, and so forth); potentially build or modify a "recipe", specifying a way to combine multiple cloud capabilities or provide lifecycle management; subsequently update the cloud capability selection(s); scale up and scale down the cloud capabilities; and in general, manage the lifecycle(s) of the ordered cloud capabilities, including retiring the capabilities.

To facilitate this user selection and control, the service consumption module 66 contains one or multiple cloud service catalogs 41 (depending on the particular implementation) and/or different views of the same catalog(s) 41, which describe available cloud capabilities. The catalog 41 itself may be a federation or aggregation of catalogs. The users may browse through the catalog(s) 41 using, for example, a graphical user interface (GUI) 65 of the interface 63. In accordance with some implementations, the service consumption module 66 may contain one or more APIs/interfaces for purposes of permitting users to browse through the catalog(s) 41 using the GUI 65. It is noted that different users may have access to different catalog(s) 41 for different views of the catalog(s) 41 (different content or different commercial terms), depending on the agreement/subscription in place. By accessing the service catalog(s) 41, users may select, order, customize and combine cloud capabilities; and automate the instantiation and configuration of selected cloud capabilities.

More specifically, in accordance with example implementations, via the service consumption module 66, users may select combinations of various existing cloud resources 20 to form a selected set of cloud services and, in general, set up a service to manage the lifecycle of this combination for a given user or group of users. As examples, the existing cloud resources 20 may include such resources as an Infrastructure as a Service (IaaS) resource 20-1 (a resource that provides hosted equipment, such as servers, storage components and network components as a service); a Platform as a Service (PaaS) resource 20-2 (a resource that provides a hosted computing platform such as an operating system, hardware, storage, and so forth); a Software as a Service (SaaS) resource 20-3 (a resource that provides hosted applications as a service); a DataBase as a Service (DBaaS) resource 20-4 (a resource that provides a hosted database as a service); and so forth.

The available existing cloud resources 20 further include, in accordance with example implementations, resources 20 that provide other services that may be useful for the cloud, such as (as examples), resources 20-5, 20-6 and 20-7 that provide services derived from their provisioning using the Server Automation (SA), Database Middleware Automation (DMA), Matrix Operating Environment (MOE), or Operations Orchestration (OO) software available from Hewlett Packard and other any other infrastructure provisioning or IaaS provisioning system. Thus, in general, the cloud resources may include these as well as other cloud services/capabilities 20-8, in accordance with further implementations.

It is noted that one or multiple of the existing cloud resources 20 may be provided by the cloud service manager 60, in accordance with example implementations.

In accordance with exemplary techniques and systems that are disclosed herein, users may access the catalog(s) 41 to select and order one or more of the following cloud services: services provided by the existing cloud resources 20; services provided by combinations of the existing cloud resources 20; and services to manage the lifecycle of selected services/combinations of services, including services directed to building, monitoring, metering, and reporting services. Moreover, the cloud service manager 60 allows agile development of these services, as users may configure various aspects of these services, as further described herein.

In addition to presenting the service offerings, the service consumption module 66 regulates user subscriptions to these services, in accordance with example implementations. In this manner, as depicted in FIG. 1, in addition to the catalogs 41 describing the service offerings, the service consumption module 66 may contain such other information as user login components 42 (components containing passwords, login identifications and so forth); user and tenant information; user subscription components 35 (components describing subscription contract terms, subscription rates, and so forth); and an engine 40 that contains logic that allows access and modification to the offered services, updating of subscription data, updating of login information and so forth.

The cloud service manager 60 contains a service delivery module 68 to deliver services that are described in the catalogs 41 and are selected by the users. More specifically, in accordance with example implementations, using the palette of available cloud resources and their resource offerings and actions, cloud service designers and/or administrators may construct plans, or "service blueprints 70," which are stored in a service repository 64 and set forth structured plans of automated actions for instantiating and configuring the cloud capabilities that are described and offered in the catalog(s) 41. Due to these pre-existing service blueprints 70, logic of an engine 92 of the service delivery module 68 may automatically undertake the actions to instantiate and configure the selected cloud capabilities, thereby avoiding manual actions by the users pertaining to instantiation and configuration of the selected cloud capabilities.

In accordance with example implementations, the service blueprint 70 is a set of workflows/recipes/scripts that correspond to particular lifecycle management actions that may be performed to orchestrate the APIs of the appropriate cloud resources for purposes of managing the lifecycle of a given cloud capability. In this regard, the actions are workflows and calls to resource offering interfaces, in accordance with some implementations. In accordance with example implementations, designers/administrators may use GUIs of the service delivery module 68 to orchestrate/compose multiple such service blueprints 70 into service blueprints 70 of new cloud capabilities.

The designers/administrators may also use GUI-based tools of the service delivery module 68 to modify existing service blueprints 70 and form new service blueprints 70 based on combinations of existing service blueprints 70. In addition to selecting pre-existing service blueprints 70, in accordance with some implementations, the service delivery module 68 may permit users to construct service blueprints 70, modify existing service blueprints 70, and/or create new service blueprints 70 from a combination of existing service blueprints 70.

Figure 4:
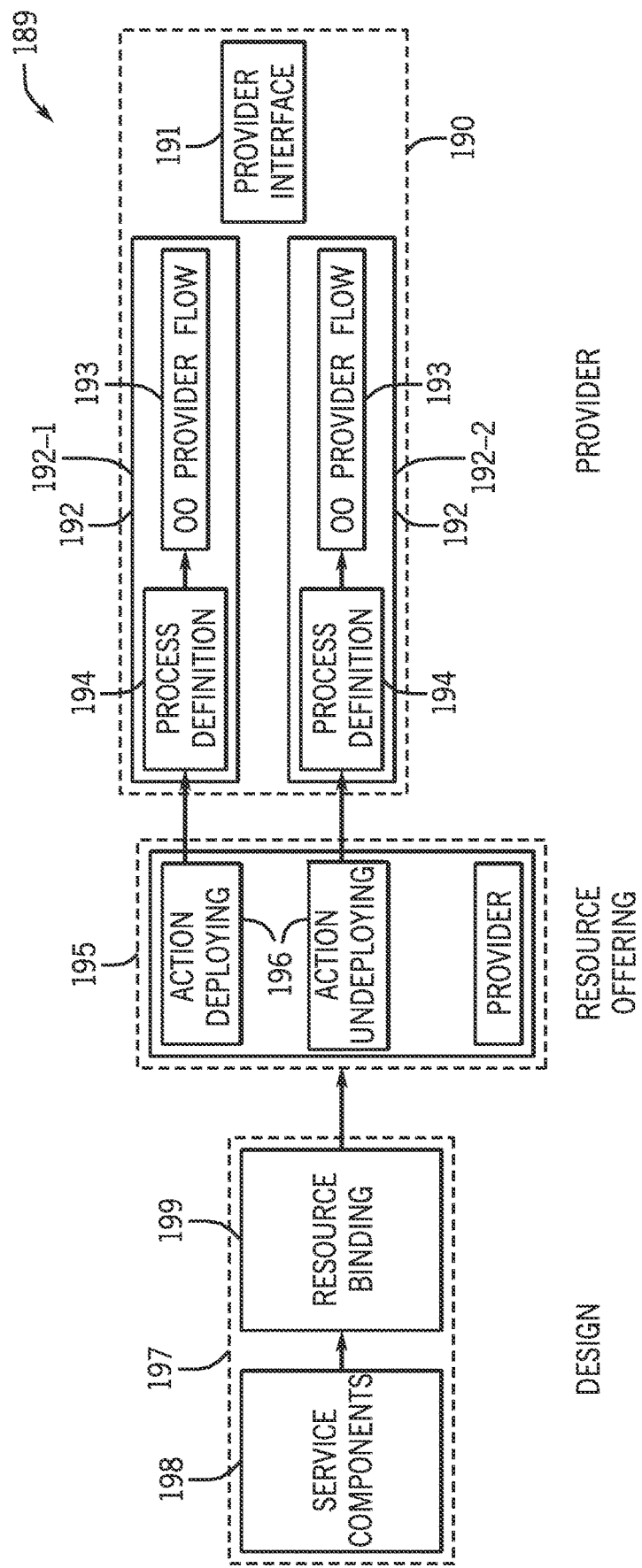
FIG. 4 is a flow diagram depicting a technique to design the service of FIG. 2 according to an example implementation.

In accordance with some implementations, a service blueprint 70 may be constructed using a workflow 189 that is illustrated in FIG. 4. Pursuant to the workflow 189, a cloud service provider 190 may include a provider interface 191 that has GUIs and tools that allow a designer/administrator to construct orchestrated flows 192-1 and 192-2, which are defined by associated process definitions 194. These orchestrated flows, in turn, create actions 196 for resource offerings 195. Thus, for example, the workflow 189 of FIG. 4 produces may produce one or more service blueprints 70 that have a design 197 constructed of service components 198 and resource bindings 199.

More specifically, in accordance with example implementations, each service blueprint 70 is an object (objects formed from machine executable instructions, that performs various actions, or functions, that may be taken in connection with an associated offered cloud capability, or service) and has an associated collection of functions, or "recipes," which may be executed to cause the orchestration of the appropriate cloud service APIs to provision, instantiate and build a cloud service (formed from one or more existing cloud services, for example); manage a cloud service; monitor a cloud service; meter a cloud service; and so forth. A recipe can be a script or workflow or any other executable, in accordance with example implementations, which may be executed by logic of the engine 92 of the service delivery module 68 for purposes of performing the actions specified by the service blueprint 70.

In accordance with example implementations, the service blueprints 70 may be associated with various commercial terms, such as prices; contract periods; terms associated with a service level agreement (SLA); and so forth, which are stored in subscription components 35 of the service composition module 66. A service becomes a service offering when associated to these terms. These terms that accompany given service blueprints 70 may be described in the catalogs 41, in accordance with some implementations and, in general, may be set forth by a product designer.

A given service blueprint 70 may be instantiated/deployed by executing its associated recipe(s), which results in service instances 44 that may be tracked by, for example, information technology (IT) management systems by feeding the service instances into an IT service management (ITSM) service, a real time service management (RTSM) service, or a configuration management database (CMDB) with a full topology of how a service instance is supported/implemented. In this manner, in accordance with example implementations, the service delivery module 68 may contain a service instance service management component 44 (e.g. RTSM or CMDB or ITSM (Information Service Management) for this purpose. If shared across an ITSM system, the component 44 is available for other management systems to monitor and manage separately the instantiated instances (identified and tracked based on topology information stored in the database). In accordance with some implementations, the actions to set up the monitoring and management are achieved through the use of the service blueprints 70.

A given service blueprint 70 may further specify actions that are taken to handle errors associated with given composition cloud service are handled and actions that taken to report such errors. In general, other service blueprints 70 may specify how the lifecycle of a given service composition is monitored and managed during the full lifecycle of the service.

For example, a given recipe may notify the owner of the system (the owner of the cloud resources 20, for example) about an error; repeat faulty steps with the same or other resource in a pool; track issues and trace back steps and tear down some of the instantiated resources/services; and so forth.

A given service blueprint 70 may also describe a structured plan for usage metering and/or reporting. For monitoring, the instance and monitoring service may be setup/configured to perform the monitoring tasks; or, alternatively, a CMDB/RTSM may be in place to let a monitoring suite such as ITSM (as an example) to automatically discover and monitor. The metering and reporting may be performed the same way by setting up the metering/reporting and adding probes or counters that allow metering (measured CPU usage, time used, memory used, or traffic used per component by using a monitoring system to interact with agents or configuring service scalable to do so to generate charging data records (CDRs) for their use and provide them to metering systems). Reporting may be accomplished by inquiring the monitoring and/or metering management systems.

Figure 2:
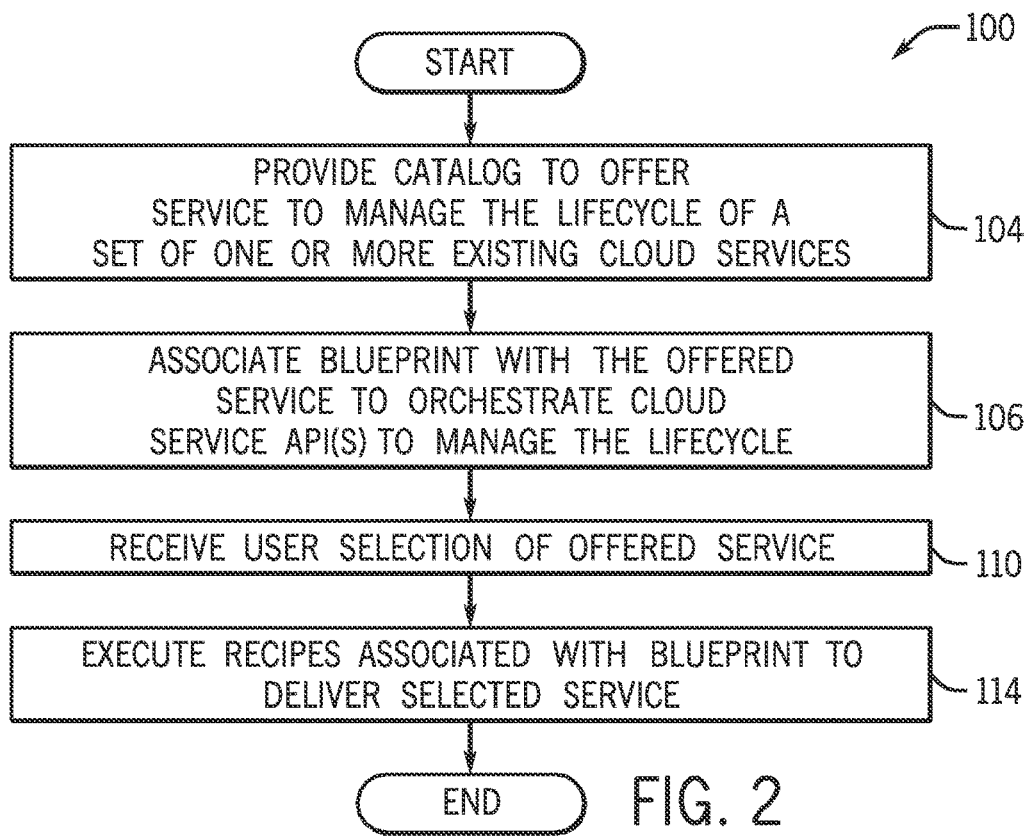
FIG. 2 is a flow diagram depicting a technique to offer and deliver a service to manage the lifecycle of a set of cloud services according to an example implementation.

Thus, to summarize, referring to FIG. 2 in conjunction with FIG. 1, in accordance with exemplary implementations, a technique 100 includes providing (block 104) a catalog to offer a cloud service to manage the lifecycle of a group of at least one existing cloud service and associating (block 106) a service blueprint with the offered cloud service to orchestrate API(s) to manage the lifecycle. The technique 100 includes receiving (block 110) user selection of the offered cloud service and executing (block 114) recipes associated with the service blueprint to deliver the selected cloud service.

In accordance with exemplary implementations, a given recipe may automate the actions that a given user may otherwise undertake for purposes of setting up the ordered cloud service. For example, referring to FIG. 3 in conjunction with FIG. 1, an exemplary recipe 150 may use, for example, three execution branches 160, 170 and 180 for purposes of setting up the infrastructure, middleware and application layers, respectively, of an ordered cloud service.

Figure 3:
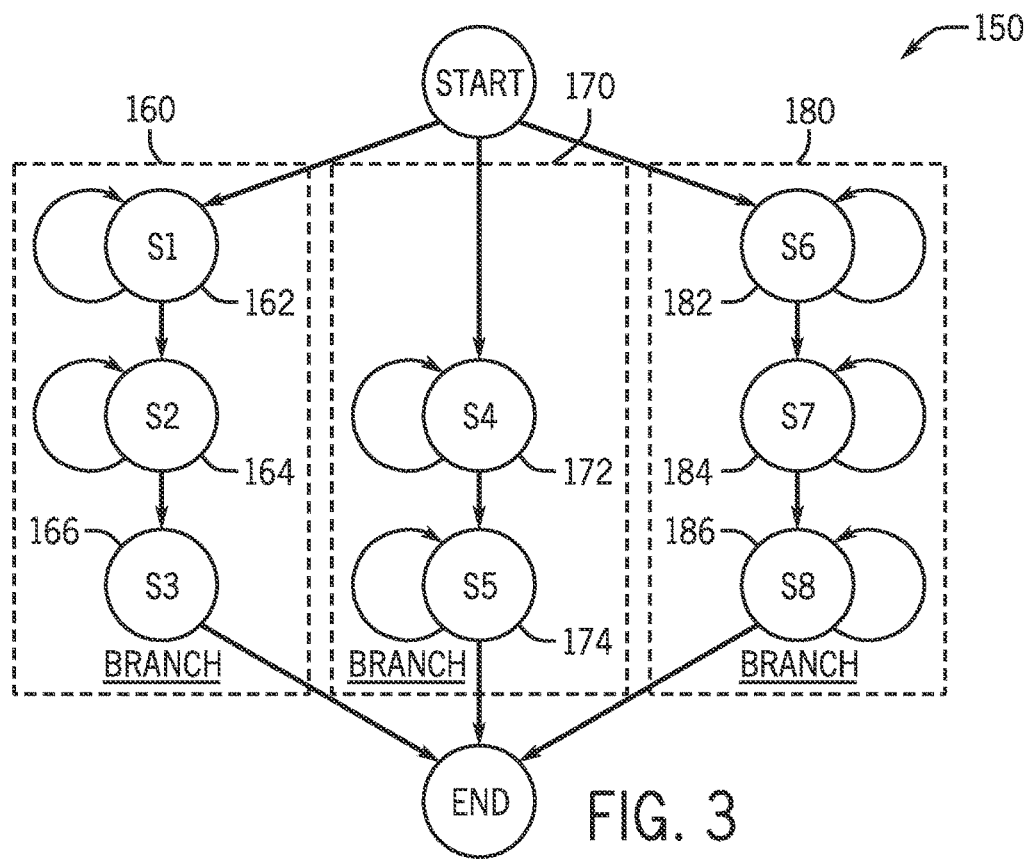
FIG. 3 is an illustration of a recipe used in connection with the technique of FIG. 2 according to an example implementation.

For example, exemplary branch 160 may include stages 162, 164 and 166 for purposes of provisioning servers, which include tiers for a database, an application server and a portal and load balancer, respectively; exemplary branch 170 may include states 172 and 174 for purposes of provisioning the servers with database and middleware, respectively; and branch 180 may include states 182, 184 and 186 for purposes of deploying the applications. As depicted in FIG. 3, the branches 160, 170 and 180 may, in general, be performed in parallel for the different tiers.

In accordance with example implementations, a service blueprint 70 may be at least partially constructed by a user/designer specifying/modifying at least part of a recipe for a given cloud service. In this manner, the user/designer may begin the design starting with "mandatory steps" or "recommended steps" for a given service blueprint 70, in accordance with some implementations, for purposes of recommending proper management of the resources.

In accordance with some implementations, cloud service designers may design new recipes to build higher level services as executable or work flow/composition/business process/scripts (i.e., flows of conditions and actions) of API calls to the resource interfaces and API calls to other functions (calls to activation/provisioning service resources, for example). Moreover, new recipes may be constructed and existing recipes may be modified by the users of the cloud service manager 60/designers. It is noted that the recipes may be constructed using, for example, an API of the cloud service manager 60 to design a script; or the construction of the recipes may be GUI-based.

In this regard, in accordance with some implementations, a designer may edit the service blueprint 70 with GUI objects representing each resource or service involved. The GUI links may represent the workflow (customizable conditions and actions, for example). By clicking on the object, the designer may then be able to customize each service blueprint of the resource or service (e.g. set variables or link variables to other contexts, etc.)

For example, in accordance with some implementations, the designer may use the logic of the engine 40 of the service consumption module 66 to add, delete or other modify recipes for a given service blueprint 70; or create a new service blueprint 70. In accordance with some implementations, the GUI guides the designer through this process. It is noted, that in accordance with some implementations, different GUIs may be provided for the different users and designers. In this regard, the storefront module 62 may contain various GUIs for designers and possibly for users to modify, delete and create service blueprints 70. Moreover, separate screens may be presented in the portal to manage order capabilities. Administrators may also use the screens if the user has a problem.

In accordance with some implementations, in general, the designer is a different persona from the user. However it is possible that a designer is made available for a user who has or wants to order a service. For example, in accordance with some implementations, designers use the service consumption module 66 to generate service blueprints for the different offerings however they do leave parts (contextual parameters, for example) of service blueprints customizable (e.g., select OS of computing resources, or size of storage, make other selections, provide options available, and so forth). A user who has or wants to order a service (typically technical users like developers) may customize the service blueprints they want or have ordered with a designer that may only change what is left unspecified (and within the limits of the options). Thus, in general, the certain contextual parameters of one or multiple service blueprints 70 may be set up at the time of execution and/or may be customized by a user or other persona.

In accordance with some implementations, an instantiated service blueprint 70 may be captured in an instantiated service repository 46. In this regard, data captured in the repository 46 may be viewed via the user interface 63 for purposes of displaying reports and statuses of purchased services to the users. The service repository 46, in addition to being populated via the designer tools, may ingest/aggregate/federate from different service repositories. It is noted that the users may also use GUI-based tools for purposes of viewing order statuses and managing order capabilities, in accordance with further implementations. A corresponding console page may also be used to call other service blueprint-related functions to manage the service instances. It is noted that information and alerts about the service blueprints resulting from monitoring the instances ensures that service blueprints recipes include deployment of appropriate agent/tool/setup to ensure management, and management tools associated to the resources are configured to monitor the instances.

It is noted that other implementations are contemplated and are within the scope of the appended claims. For example, a given catalog 41 may ingest or aggregate/federate other catalogs that may or may not be associated with service blueprints 70, in accordance with further implementations.

Among its other features, the service delivery module 68 may further include resource provider components 42 describing the cloud resource providers; resource environment components 44 describing the cloud resource provider environments; and resource offering components 30, which are components that expose (the APIs the existing cloud resources 20. In general, the resource offering components 30 describe offering details, such as the cloud service resources 60, the capacities of the resources 20, the number of requests that can be made to provision the cloud resources 20, and so forth. The resource offering components 30 may be automatically updated as requirements and capabilities of the cloud resources 20 change, in accordance with example implementations.

The service delivery module 68 may offer components that the user may control through the GUI 65 for purposes of managing an ordered cloud service. For example, the service delivery module 68 may contain a user accessible lifecycle controller 45 for purposes of managing the lifecycle (reserve, instantiate, monitor, scale up/scale down, acquire usage details, uninstantiate, unreserve, and so forth) of the service as well as a scaler 47 to scale up or down (scale up/down the bandwidth, storage capacity, processing power, and so forth) the cloud service. It is noted the user may see the RTSM (instance repository) for the services/capabilities that user has ordered/subscribed to and perform actions on them. The actions that are performed executes the corresponding scripts in the service blueprints associated with the capability/service on the instance in question]

Figure 5:
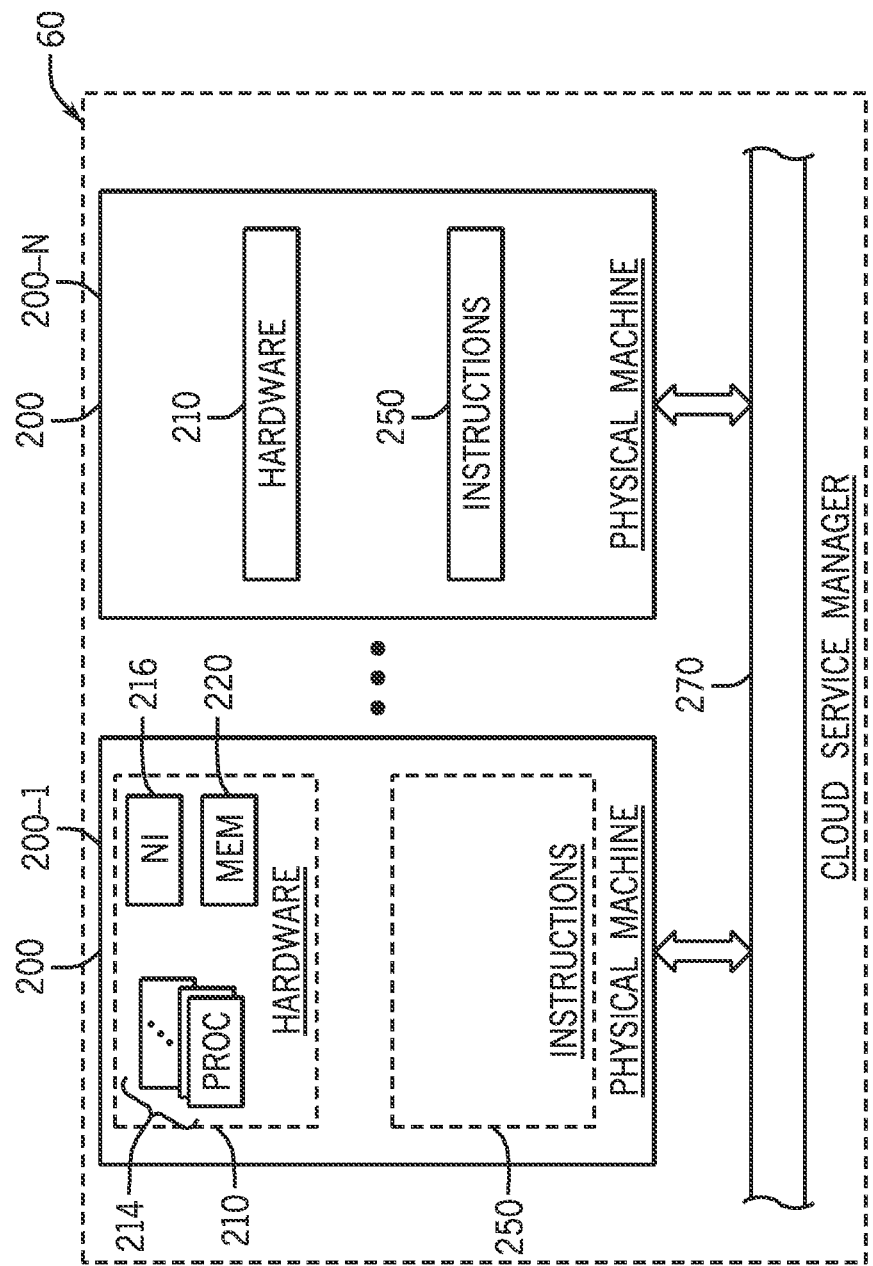
FIG. 5 is a schematic diagram of a machine architecture of a cloud service manager of FIG. 1 according to an example implementation.

Referring to FIG. 5, in accordance with example implementations, the cloud service manager 60 includes one or multiple physical machines 200 (N physical machines 200-1 . . . 200-N, being depicted as examples in FIG. 5). The physical machine 200 is a machine that is made of actual hardware 210 and actual machine executable instructions 250. Although the physical machines 200 are depicted in FIG. 5 as being contained within corresponding boxes, a particular physical machine 200 may be a distributed machine, which has multiple nodes that provide a distributed and parallel processing system.

In accordance with exemplary implementations, the physical machine 200 may be located within one cabinet (or rack); or alternatively, the physical machine 200 may be located in multiple cabinets (or racks).

A given physical machine 200 may include such hardware 210 as one or more processor 214 and a memory 220 that stores machine executable instructions 250, application data, configuration data and so forth. In general, the processor 214 may be a processing core, a central processing unit (CPU), and so forth. Moreover, in general, the memory 220 is a non-transitory memory, which may include semiconductor storage devices, magnetic storage devices, optical storage devices, and so forth.

The physical machine 200 may include various other hardware components, such as a network interface 216 and one or more of the following; mass storage drives; a display, input devices, such as a mouse and a keyboard; removable media devices; and so forth.

The machine executable instructions 250 contained in the physical machine 200 may, when executed by the processor(s) 214, cause the processor(s) 214 to form one or more components of the cloud service manager 60. In general, the physical machines 200 communicate with each other over a communication link 270. This communication link 270, in turn, may be coupled to the user end devices 50 (see FIG. 1) and as such, may form at least part of the network fabric 51 (see FIG. 1). As non-limiting examples, the communication link 270 represents one or multiple types of network fabric (i.e., wide area network (WAN) connections, local area network (LAN) connections, wireless connections, Internet connections, and so forth). Thus, the communication link 270 may represent one or more multiple buses or fast interconnects.

As an example, the cloud service provider may be an application server farm, a cloud server farm, a storage server farm (or storage area network), a web server farm, a switch, a router farm, and so forth. Although two physical machines 200 (physical machines 200-1 and 200-N) are depicted in FIG. 5 for purposes of a non-limiting example, it is understood that the cloud service manager 60 may contain a single physical machine 200 or may contain more than two physical machines 200, depending on the particular implementation (i.e., "N" may be "1," "2," or a number greater than "2").

Other implementations are contemplated and are within the scope of the appended claims. For example, referring back to FIG. 1, in further implementations, the cloud service manager 60 may provide one or more of the underlying existing cloud services and as such, may function as one of the cloud resources 20. As a more specific example, in accordance with some implementations, the cloud service manager 60 may provide the SA, 00 and/or MOE service. As examples of further implementations, the cloud service manager 60 may be a cloud service (SaaS), may be executed by a web server, may be an application executed on a user end system 50, and so forth.

While a limited number of examples have been disclosed herein, those skilled in the art, having the benefit of this disclosure, will appreciate numerous modifications and variations therefrom. It is intended that the appended claims cover all such modifications and variation

What is claimed is:

1. A method comprising:
maintaining, at a system comprising a hardware processor, a service blueprint that includes a set of one or more recipes to automate lifecycle actions for a user-selectable cloud capability associated with the service blueprint, wherein the set of one or more recipes, when executed, orchestrate an application programming interface of a cloud resource to perform the lifecycle actions;
receiving, at the system, a selection from a user of the user-selectable cloud capability;
receiving, at the system and from the user, a modification of the user-selectable cloud capability to add a metering service for metering of central processing unit (CPU) usage, memory usage, or traffic usage associated with the user-selectable cloud capability;
updating, by the system and in response to the modification received from the user, the service blueprint to further include a structured plan for the metering; and
in response to receiving the selection, executing, at the system, the set of one or more recipes of the service blueprint to orchestrate the application programming interface of the cloud resource to perform the lifecycle actions that manage a lifecycle of the user-selectable cloud capability, wherein the lifecycle actions include executing the metering service.

2. The method of claim 1, wherein the user-selectable cloud capability includes a cloud service or a combination of cloud services provided by cloud resources, and the cloud resource is among the cloud resources.

3. The method of claim 2, wherein the lifecycle actions include instantiating and configuring the cloud service or the combination of cloud services.

4. The method of claim 1, wherein the cloud resource comprises an as a Service (aaS) resource.

5. The method of claim 1, further comprising providing an interface that provides access for the user to order or subscribe to cloud capabilities.

6. The method of claim 1, further comprising regulating subscriptions to cloud capabilities, the regulating including maintaining user or tenant information and maintaining subscription information.

7. The method of claim 1, further comprising:
receiving, from a user interface, an input to add, delete, or modify a recipe in the service blueprint; and
modifying, at the system, the service blueprint based on the input to add, delete, or modify the recipe.

8. A system comprising:
a processing resource; and
a non-transitory machine readable medium encoded with instructions that, when executed by the processing resource, cause the processing resource to:
maintain a service blueprint that includes a set of one or more recipes to automate lifecycle actions for a user-selectable cloud capability associated with the service blueprint, wherein the set of one or more recipes, when executed, orchestrate an application programming interface of a cloud resource to perform the lifecycle actions;
receive a selection from a user of the user-selectable cloud capability;
receive, at the system and from the user, a modification of the user-selectable cloud capability to add a metering service for metering of central processing unit (CPU) usage, memory usage, or traffic usage associated with the user-selectable cloud capability;
update, by the system and in response to the modification received from the user, the service blueprint to further include a structured plan for the metering; and
execute the set of one or more recipes of the service blueprint in response to receiving the selection to orchestrate the application programming interface of the cloud resource to perform the lifecycle actions that manage a lifecycle of the user-selectable cloud capability, wherein the lifecycle actions include executing the metering service.

9. The system of claim 8, wherein the user-selectable cloud capability includes a cloud service provided by the cloud resource, and
the lifecycle actions include instantiating and configuring the cloud service.

10. The system of claim 9, wherein the configuring of the cloud service comprises scaling up or scaling down a bandwidth, a storage capacity, or a processing power of the cloud service.

11. The system of claim 8, wherein the user-selectable cloud capability includes a combination of cloud services provided by cloud resources that includes the cloud resource.

12. The system of claim 8, wherein the instructions, when executed, cause the processing resource to provide an interface that provides the user with access to order or subscribe to cloud capabilities.

13. The system of claim 8, wherein the instructions, when executed, cause the processing resource to regulate subscriptions to cloud capabilities.

14. A non-transitory machine readable medium storing instructions that, when executed by a processing resource, cause the processing resource to:
maintain a service blueprint that includes a set of one or more recipes to automate lifecycle actions for a user-selectable cloud capability associated with the service blueprint, wherein the set of one or more recipes, when executed, orchestrate an application programming interface of a cloud resource to perform the lifecycle actions;
receive a selection from a user of the user-selectable cloud capability;
receive, at the system and from the user, a modification of the user-selectable cloud capability to add a metering service for metering of central processing unit (CPU) usage, memory usage, or traffic usage associated with the user-selectable cloud capability;
update, by the system and in response to the modification received from the user, the service blueprint to further include a structured plan for the metering; and
execute the set of one or more recipes of the service blueprint in response to receiving the selection to orchestrate the application programming interface of the cloud resource to perform the lifecycle actions that manage a lifecycle of the user-selectable cloud capability, wherein the lifecycle actions include executing the metering service.

15. The non-transitory machine readable medium of claim 14, wherein the user-selectable cloud capability includes a cloud service provided by the cloud resource, and
the lifecycle actions include instantiating and configuring the cloud service.

16. The non-transitory machine readable medium of claim 15, wherein the configuring of the cloud service comprises scaling up or scaling down a bandwidth, a storage capacity, or a processing power of the cloud service.

17. The non-transitory machine readable medium of claim 14, wherein the user-selectable cloud capability includes a combination of cloud services provided by cloud resources that includes the cloud resource.

18. The non-transitory machine readable medium of claim 14, wherein the instructions, when executed, cause the processing resource to provide an interface that provides the user with access to order or subscribe to cloud capabilities.

19. The non-transitory machine readable medium of claim 14, wherein the instructions, when executed, cause the processing resource to:
receive, from a user interface, an input to add, delete, or modify a recipe in the service blueprint; and
modify the service blueprint based on the input to add, delete, or modify the recipe.

* * * * *